United States Patent
Huang et al.

(10) Patent No.: US 9,963,041 B2
(45) Date of Patent: May 8, 2018

(54) CHARGING APPARATUS WITH STATUS INDICATION

(71) Applicant: GREATLINK ELECTRONICS TAIWAN LTD., Taipei Hsien (TW)

(72) Inventors: Ming-Lang Huang, Taipei (TW); Yih-Chung Huang, Taipei (TW)

(73) Assignee: GREATLINK ELECTRONICS TAIWAN LTD., Taipei Hsien (TW)

(*) Notice: Subject to any disclaimer, the term of this patent is extended or adjusted under 35 U.S.C. 154(b) by 152 days.

(21) Appl. No.: 15/185,235

(22) Filed: Jun. 17, 2016

(65) Prior Publication Data

US 2017/0361720 A1    Dec. 21, 2017

(51) Int. Cl.
| | |
|---|---|
| *H02J 7/00* | (2006.01) |
| *G08B 1/08* | (2006.01) |
| *G08C 19/16* | (2006.01) |
| *B60L 11/18* | (2006.01) |

(52) U.S. Cl.
CPC ....... *B60L 11/1824* (2013.01); *B60L 11/1816* (2013.01); *B60L 2230/12* (2013.01); *B60L 2230/16* (2013.01)

(58) Field of Classification Search
CPC ..... Y02T 90/14; Y02T 90/128; Y02T 90/163; Y02T 10/7005; Y02T 90/7088; Y02T 10/705; Y02T 10/7008; B60L 11/1824; B60L 11/1816; B60L 2230/12; B60L 2230/16; H04B 3/54; H04B 2203/5416; H04B 2203/5483; H04B 2203/545; H04B 2203/5458; G08C 19/12; G08C 15/00; G08C 19/02; G08C 17/04; H03M 1/00; Y02E 60/12

USPC ................ 320/104, 109; 340/538.11, 870.18
See application file for complete search history.

(56) References Cited

U.S. PATENT DOCUMENTS

| | | | |
|---|---|---|---|
| 2010/0213896 A1* | 8/2010 | Ishii ...................... | B60L 3/0069 320/109 |
| 2011/0302078 A1* | 12/2011 | Failing ...................... | B60L 3/00 705/39 |
| 2014/0210449 A1* | 7/2014 | Ichikawa ............ | B60L 11/1842 324/76.11 |

* cited by examiner

*Primary Examiner* — Yalkew Fantu
*Assistant Examiner* — Mohammed J Sharief
(74) *Attorney, Agent, or Firm* — Li & Cai Intellectual Property (USA) Office

(57) ABSTRACT

A charging apparatus with status indication for charging an electric vehicle. The charging apparatus includes a power supply device and a coupler. The power supply device includes a processing module, an indicator control unit and a signal modulation unit. The coupler is electrically connected to the power supply device through a power cable and includes a signal demodulation unit and an indicator unit. The processing module instructs the indicator control unit to output a status control signal to the signal modulation unit according to the connection status of the coupler and the electrical vehicle. The signal modulation unit modulates the status control signal and transmits the modulated status control signal through the power cable to the signal demodulation unit. The signal demodulation unit demodulates the modulated status control signal into the status control signal and outputs the status control signal to the indicator unit.

10 Claims, 7 Drawing Sheets

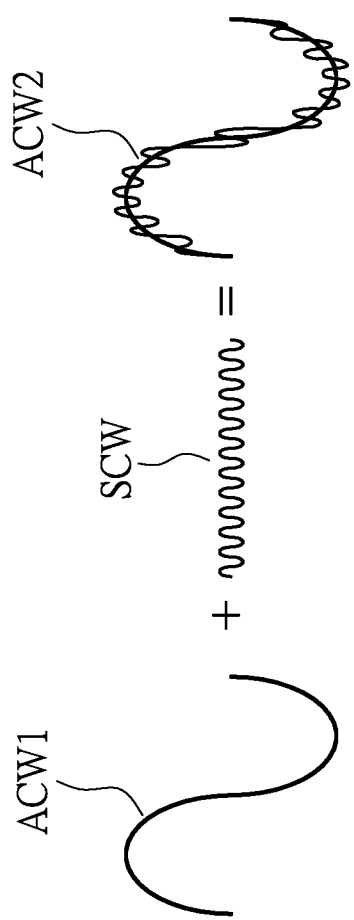

CHARGING APPARATUS WITH STATUS INDICATION

BACKGROUND

1. Technical Field

The present invention generally relates to a charging apparatus with status indication and, more particularly, to a charging apparatus for an electric vehicle.

2. Description of Related Art

Electric vehicles include, for example, hybrid vehicles, direct-current (DC) electric vehicles, alternate-current (AC) electric vehicles, electric locomotives, electric bicycles, electric battery vehicles (BEVs) or other vehicles driven by electric motors. Electric vehicles use batteries powered by external power to supply power to the electric motors to drive the electric vehicles.

Since electric vehicles are powered by electric power from batteries, the distance that an electric vehicle can travel depends on the cost and the technology of batteries. Moreover, the battery efficiency is influenced by the road condition, the traffic condition, the vehicle weight, etc. Accordingly, the distance that an electric vehicle can travel cannot be precisely predicted. As a result, electric vehicles often need to be charged at a charging base station or by a charging apparatus indoors.

However, it generally takes a long time to complete charging an electric vehicle. The user can only check the power status of an electric vehicle after the charging is completed. The user has to enter an electric vehicle to acquire the power status after checking the power meter, or the user acquires the power status when a sound or a signal is generated after the charging is completed. All of this leads to inconvenience.

SUMMARY

One object of the present invention is to provide a charging apparatus with status indication and a status indication method thereof, using modulation and demodulation of a status control signal to implement various charging statuses of a coupler to enhance the convenience of the charging apparatus.

The present invention provides a charging apparatus with status indication for charging an electric vehicle. The charging apparatus includes a power supply device and a coupler. The power supply device includes a processing module, an indicator control unit and a signal modulation unit. The indicator control unit is electrically connected to the processing module and the signal modulation unit. The power supply device is configured to store electric power and supply electric power to the electric vehicle. The coupler is electrically connected to the power supply device through a power cable and includes a signal demodulation unit and an indicator unit. The indicator unit is electrically connected to the signal demodulation unit. The coupler is detachably electrically connected to the electric vehicle. The processing module instructs the indicator control unit to output a status control signal to the signal modulation unit according to a connection status of the coupler and the electrical vehicle. The signal modulation unit modulates the status control signal and transmits the modulated status control signal through the power cable to the signal demodulation unit. The signal demodulation unit demodulates the modulated status control signal into the status control signal and outputs the status control signal to the indicator unit. The indicator unit generates a status signal according to the status control signal.

In one embodiment of the present invention, a charging apparatus with status indication is provided using modulation and demodulation of status control signal so that an indicator unit of the coupler emits light beams of various colors. Therefore, the user acquires the status of the charging apparatus according to the colors of the light beams. As a result, the convenience of the charging apparatus with status indication is enhanced.

In order to further understand the techniques, means and effects of the present invention, the following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

FIG. 2A shows communication on a power cable according to the embodiment of the present invention in FIG. 2;

DESCRIPTION OF THE EXEMPLARY EMBODIMENTS

The detailed description set forth below in connection with the appended drawings is intended as a description of certain embodiments of the present invention, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present invention.

Figure 1:
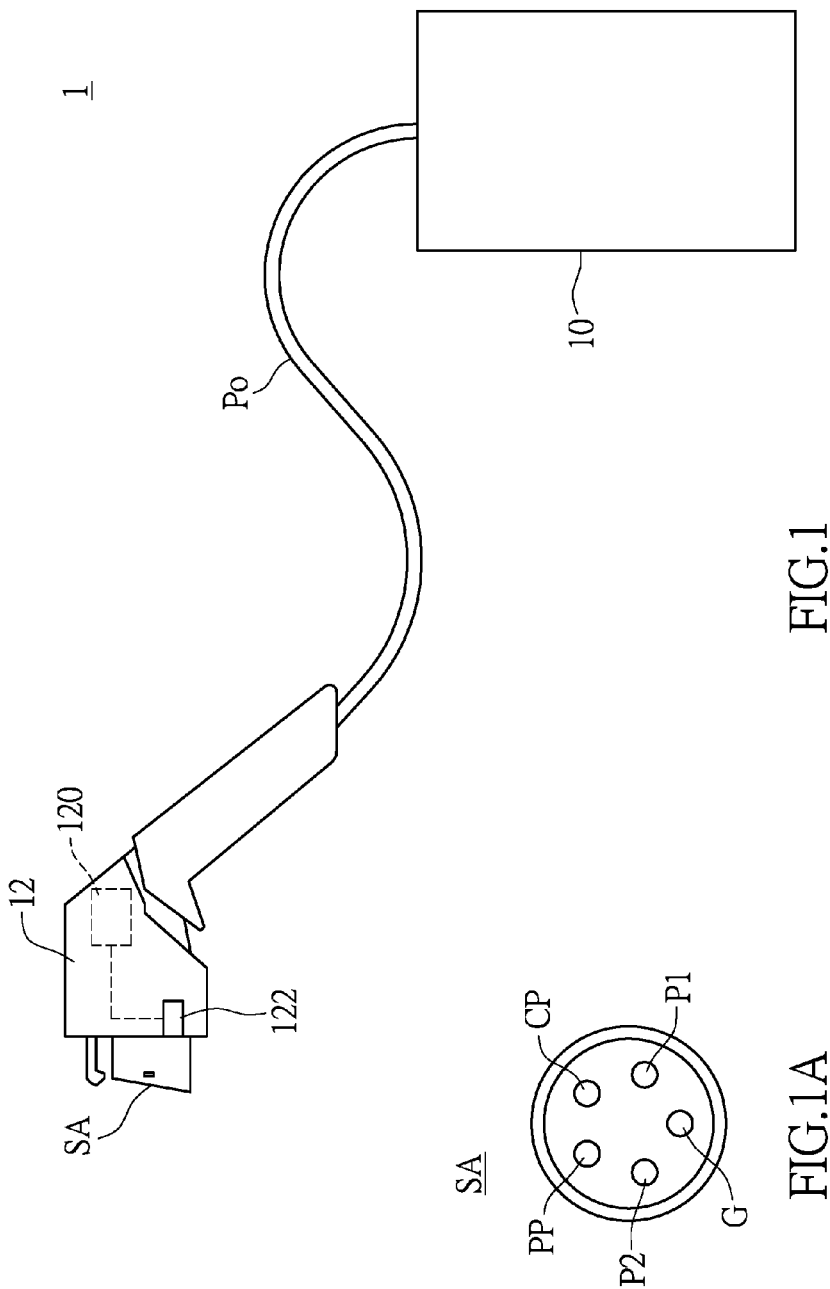
FIG. 1 is a schematic diagram of a charging apparatus with status indication according to one embodiment of the present invention.

FIG. 1 is a schematic diagram of a charging apparatus with status indication according to one embodiment of the present invention. Please refer to FIG. 1 for a charging apparatus with status indication 1 for charging an electric vehicle. The charging apparatus 1 includes a power supply device 10, a power cable Po and a coupler 12. Practically, the power cable Po is electrically connected to the power supply device 10 and the coupler 12. The power supply device 10 is configured to store electric power and supply electric power to the electric vehicle. The coupler 12 is detachably electrically connected to the electric vehicle. Therefore, the user can use the coupler 12 to electrically connect the electric vehicle so that the power supply device 10 outputs electric power to charge the electric vehicle through the coupler 12.

The coupler 12 includes a signal demodulation unit 120 and an indicator unit 122. Practically, the signal demodulation unit 120 is installed in the coupler 12. The indicator unit 122 is installed on one side of the coupler 12. The indicator unit 122 is, for example, implemented by at least one light-emitting diode (LED) indicator, a three-color (RGB) light-emitting diode, a display, a buzzer or other indicators. The present invention is not limited to the examples of the signal demodulation unit 120, the indicator unit 122 and the coupler 12.

For example, when the user electrically connects the coupler 12 with an electric vehicle, the indicator unit 122 emits a blue light beam, for example, to show that the charging apparatus 1 is in preparation or is ready for charging the electric vehicle. After the charging apparatus 1 and the electric vehicle start to communicate, the indicator unit 122 emits a green light beam, for example, to show that the charging apparatus 1 is charging the electric vehicle. When the electric vehicle has been charged to saturation, the indicator unit 122 emits a yellow light beam, for example, to show that the electric vehicle has been charged to saturation and the charging apparatus 1 has stopped charging the electric vehicle.

When the power supply device 10, the coupler 12 of the charging apparatus 1 or the electric vehicle fails, the indicator unit 122 emits a red light beam, for example, to show that the power supply device 10, the coupler 12 of the charging apparatus 1 or the electric vehicle has failed. For example, when the charging voltage is too high, the charging current is too large, the current is unstable, or the battery in the electric vehicle fails, the indicator unit 122 generates a status signal to alert the user. In other embodiments, the indicator unit 122 may also alert the user through a sound or other way. Persons with ordinary skill in the art may determine the relation between the indicated status and the color of the light beam emitted by the indicator unit 122 and also the relation between the indicated status and the type of the buzzer of the indicator unit 122. The present invention is not limited to the examples of the charging apparatus 1.

Figure 1A:
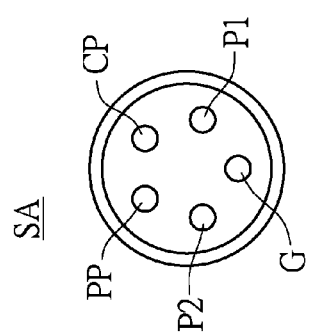
FIG. 1A is a schematic diagram of a connector of a coupler according to the embodiment of the present invention in FIG. 1.

FIG. 1A is a schematic diagram of a connector of a coupler according to the embodiment of the present invention in FIG. 1. The connector SA of the coupler 12 includes, for example, two power transmission portions P1 and P2, two signal portions CP and PP, and a grounding portion G. The power transmission portions P1 and P2, the signal portions CP and PP and the grounding portion G are terminals, pins or sockets. For the sake of description, in the present embodiment, the power transmission portions P1 and P2, the signal portions CP and PP and the grounding portion G are terminals, i.e., two power transmission terminals, two signal terminals and a grounding terminal.

The two power transmission portions P1 and P2 are, for example, a neutral terminal and a hot terminal. The two signal portions CP and PP are, for example, a control pilot signal terminal and a proximity detection terminal. For the sake of description, the first signal portion CP is, for example, a control pilot signal terminal, and the second signal portion PP is, for example, a proximity detection terminal. The control pilot signal terminal is used as a transmission channel between the electric vehicle and the power supply device 10. The proximity detection terminal is configured to detect whether the coupler 12 is connected to the electric vehicle. In other embodiments, the coupler 12 includes five, seven or more terminals. The present invention is not limited to the number and the type of examples of the power transmission portions P1 and P2, the signal portions CP and PP and the grounding portion G.

Figure 2:
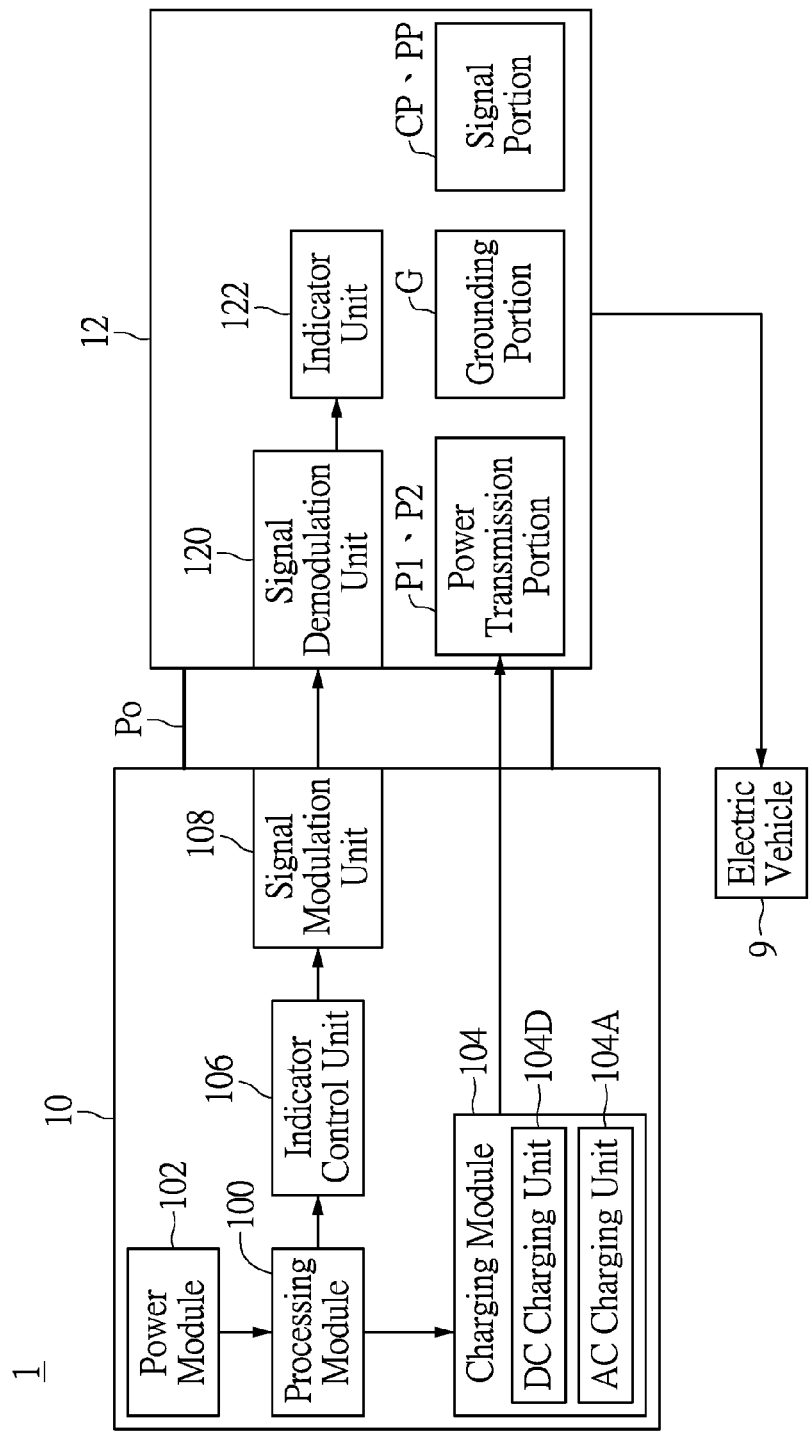
FIG. 2 is a functional diagram of a charging apparatus with status indication according to another embodiment of the present invention.

FIG. 2 is a functional diagram of a charging apparatus with status indication according to another embodiment of the present invention. Referring to FIG. 2, the power supply device 10 includes a power module 102, a processing module 100, a charging module 104, an indicator control unit 106 and a signal modulation unit 108. Practically, the power module 102 and the charging module 104 are electrically connected to the processing module 100, respectively. The processing module 100 is electrically connected to the power module 102, the charging module 104 and the indicator control unit 106. The indicator control unit 106 is electrically connected to the processing module 100 and the signal modulation unit 108.

More particularly, the power module 102 provides AC power or DC power implemented, for example, by the utility, batteries, solar power generators or power generators. For the sake of description, in the present embodiment, the power module 102 is exemplified by an AC power module. The present invention is not limited to the examples of the power module 102.

The charging module 104 includes a DC charging unit 104D and an AC charging unit 104A. The DC charging unit 104D is implemented, for example, by a DC charging circuit, a boost circuit, a buck circuit, a buck-boost circuit, an over-voltage protection circuit, an over-current protection circuit or a combination thereof. The AC charging unit 104A is implemented, for example, by an inverter circuit, an AC charging circuit, an over-voltage protection circuit, an over-current protection circuit or a combination thereof. The present invention is not limited to the examples of the charging module 104.

For example, the charging apparatus 1 includes a coupler 12. The DC charging unit 104D outputs DC power to the electric vehicle 9 through the coupler 12 or the AC charging unit 104A outputs AC power to the electric vehicle 9 through the coupler 12. In other words, the coupler 12 is, for example, a DC coupler or an AC coupler. In other embodiments, the charging apparatus 1 includes two or more DC or AC couplers 12. The DC couplers are electrically coupled to the DC charging unit 104D. The DC charging unit 104D outputs DC power to the electric vehicle 9 through the DC couplers. The AC couplers are electrically coupled to the AC charging unit 104A. AC charging unit 104A outputs AC power to the electric vehicle 9 through the AC couplers. The present invention is not limited to the number and type of the couplers 12.

The processing module 100 is implemented, for example, by a processor, a microprocessor, a control circuit, a processing circuit or a decision circuit. The present invention is not limited to the examples of the processing module 100. The indicator control unit 106 is, for example, an LED controller, an indicator controller, a meteor light controller, a strobe light controller, a breathing light controller, a gradient light controller, a buzzer controller, a display controller or other controllers. The present invention is not limited to the examples of the indicator control unit 106.

The coupler 12 includes a signal demodulation unit 120 and an indicator unit 122. The indicator unit 122 is electrically connected to the signal demodulation unit 120. The processing module 100 instructs the indicator control unit 106 to output a status control signal to the signal modulation unit 108 according to a connection status of the coupler 12 and the electrical vehicle 9. The signal modulation unit 108 modulates the status control signal and transmits the modulated status control signal through the power cable Po to the signal demodulation unit 120. The signal demodulation unit 120 demodulates the modulated status control signal into the status control signal and outputs the status control signal to the indicator unit 122. The indicator unit 122 generates a status signal according to the status control signal.

It should be noted that the signal modulation unit 108 uses AC power as a carrier to modulate the status control signal with an AC electric wave carrier and the signal demodulation unit 120 demodulates the status control signal from the AC electric wave. The status control signal includes a charging indicator signal, a preparation indicator signal, a charging alert indicator signal, a charging saturation indicator signal or a combination thereof. The present invention is not limited to the examples of the status control signal.

Furthermore, the coupler 12 includes a first signal portion CP and a second signal portion PP. The first signal portion CP and the second signal portion PP are electrically connected to the power cable Po, respectively. When the coupler 12 is electrically connected to the electric vehicle 9, the second signal portion PP detects the electric vehicle 9 and outputs a detection signal to the processing module 100. The processing module 100 communicates with the electric vehicle 9 through the first signal portion CP. The processing module 100 acquires a vehicle data of the electric vehicle 9 through the first signal portion CP. The vehicle data includes the saturation power, the remaining power, the input voltage, the input current, the output voltage, the output current, the battery failure, the remaining life and a combination thereof of a battery module.

Moreover, the coupler 12 further includes a first power transmission portion P1, a second power transmission portion P2 and a grounding portion G. The first power transmission portion P1, the second power transmission portion P2 and the grounding portion G are electrically connected to the power cable Po, respectively. The power supply device 10 supplies electric power to the electric vehicle 9 through the power cable Po, the first power transmission portion P1 and the second power transmission portion P2 of the coupler 12.

For example, when the coupler 12 is electrically connected to the electric vehicle 9, the processing module 100 detects the electric vehicle 9 through the second signal portion PP and outputs a preparation indicator signal of the status control signal to the indicator control unit 106. Thereby, the power supply device 10 transmits the status control signal to the coupler 12 by power cable communication. Therefore, the indicator unit 122 emits blue light to show that the charging apparatus 1 is in preparation.

When the processing module 100 communicates with the electric vehicle 9 through the first signal portion CP or the processing module 100 acquires the vehicle data of the electric vehicle 9 through the first signal portion CP, the processing module 100 outputs a charging indicator signal of the status control signal to the indicator control unit 106. Thereby, the power supply device 10 transmits the status control signal to the coupler 12 by power cable communication. Therefore, the indicator unit 122 emits green light to show that the charging apparatus 1 is charging the electric vehicle 9.

When the processing module 100 communicates with the electric vehicle 9 through the first signal portion CP and is informed that the electric vehicle 9 has been charged to saturation, the processing module 100 outputs a charging saturation indicator signal of the status control signal to the indicator control unit 106. Thereby, the power supply device 10 transmits the status control signal to the coupler 12 by power cable communication. Therefore, indicator unit 122 emits yellow light to show that the electric vehicle 9 has been charged to saturation and the charging apparatus 1 has stopped charging the electric vehicle 9.

When the processing module 100 is informed that the power module 102, the charging module 104, the electric vehicle 9 or a combination thereof fails, the processing module 100 outputs a charging alert indicator signal of the status control signal to the indicator control unit 106. Thereby, the power supply device 10 transmits the status control signal to the coupler 12 by power cable communication. Therefore, indicator unit 122 emits red light to show that the power module 102, the charging module 104, the electric vehicle 9 or a combination thereof has failed.

FIG. 2A shows communication on a power cable according to the embodiment of the present invention in FIG. 2. FIG. 2A shows an AC electric wave ACW1, a status control signal SCW and a modulated status control signal ACW2. The AC electric wave ACW1 is, for example, 110-V AC power at 60 Hz. The status control signal SCW is, for example, a 12-V signal at 1 MHz. The signal modulation unit 108 modulates the 12-V status control signal SCW at 1 MHz with the 110-V C electric wave ACW1 at 60 Hz to generate the modulated status control signal ACW2.

Moreover, the signal demodulation unit 120 of the coupler 12 receives the modulated status control signal ACW2 and demodulates the modulated status control signal ACW2 into the status control signal SCW. Therefore, the indicator unit 122 of the coupler 12 outputs the status signal, for example, with blue, green, yellow or red light. Persons with ordinary skill in the art may determine the AC electric wave ACW1, the status control signal SCW and the modulated status control signal ACW2 according to the teaching of the present embodiment.

Figure 3:
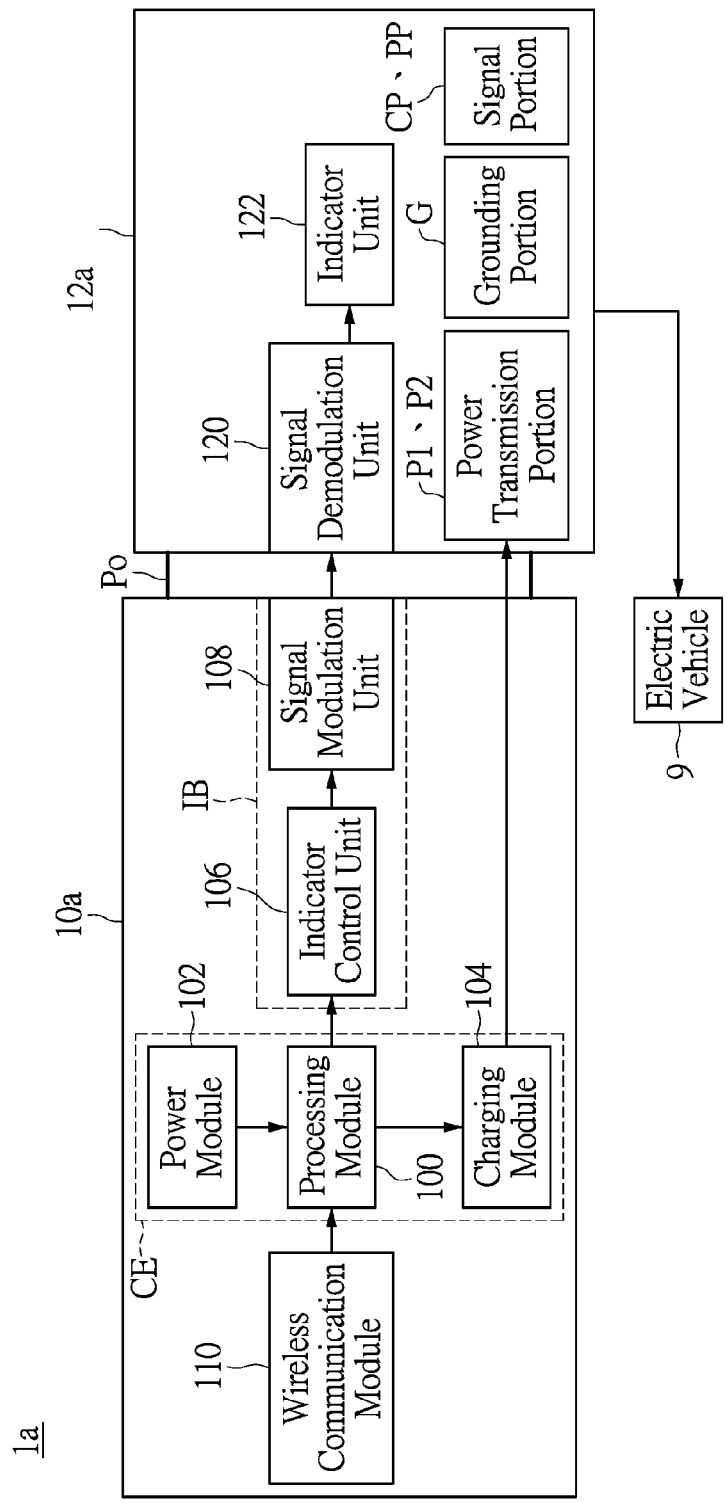
FIG. 3 is a functional diagram of a charging apparatus with status indication according to another embodiment of the present invention.

FIG. 3 is a functional diagram of a charging apparatus with status indication according to another embodiment of the present invention. Referring to FIG. 3, the charging apparatus 1a of the present embodiment is similar to the charging apparatus 1 of the previous embodiment in FIG. 2. However, the charging apparatus 1a is different from the charging apparatus 1 in that the charging apparatus 1a further includes a wireless communication module 110 electrically connected to the processing module 100. The wireless communication module 110 is configured to wirelessly communicate with the electric vehicle 9 to acquire a vehicle data of the electric vehicle 9.

The vehicle data includes the saturation power, the remaining power, the input voltage, the input current, the output voltage, the output current, the battery failure, the remaining life and a combination thereof of a battery module. In other embodiments, the vehicle data may also include the type, the model, the ID and other information of the vehicle. The present invention is not limited to the examples of the vehicle data.

More particularly, the wireless communication module 110 is implemented by a Wi-Fi communication device, a Blue-tooth communication device, a radio-frequency (RF)

communication device or other communication devices. The present invention is not limited to the examples of the wireless communication module 110. Therefore, the power supply device 10a acquires the vehicle data of the electric vehicle 9 through the wireless communication module 110. Moreover, before the coupler 12a is connected to the electric vehicle 9, the wireless communication module 110 is provided as a communication channel between the power supply device 10a and the electric vehicle 9 in advance.

For example, when the electric vehicle 9 is at a low power level and needs to be charged at a local charging station, the wireless communication module 110 of the power supply device 10a communicates with the electric vehicle 9 in advance to instruct the electric vehicle 9 to the charging station. When the coupler 12a is electrically connected to the electric vehicle 9, the processing module 100 may charge the electric vehicle 9 rapidly to shorten the operation time for building up communication between the processing module 100 and the electric vehicle 9.

Moreover, on the charging alert status, the power supply device 10a generates an alarm sound through a buzzer (not shown), for example, or transmits an alert message to a mobile communication device of the user through a wireless communication module 110 so as to alert the user. The present invention is not limited to the examples of the wireless communication module 110.

Moreover, the power supply device 10a includes an indicator portion IB and a charging portion CE. The indicator portion IB is electrically connected to the charging portion CE. The indicator control unit 106 and the signal modulation unit 108 are installed in the indicator portion IB. The power module 102, the processing module 100 and the charging module 104 are installed in the charging portion CE. In other embodiments, the power module 102, the processing module 100, the charging module 104, the indicator control unit 106 and the signal modulation unit 108 can be installed inside a main body; or the power module 102, the processing module 100, the charging module 104, the indicator control unit 106 the signal modulation unit 108 or a combination thereof can be installed in the charging portion CE, or the indicator portion IB. Persons with ordinary skill in the art may determine the examples and installations of the indicator portion IB and the charging portion CE.

Figure 4:
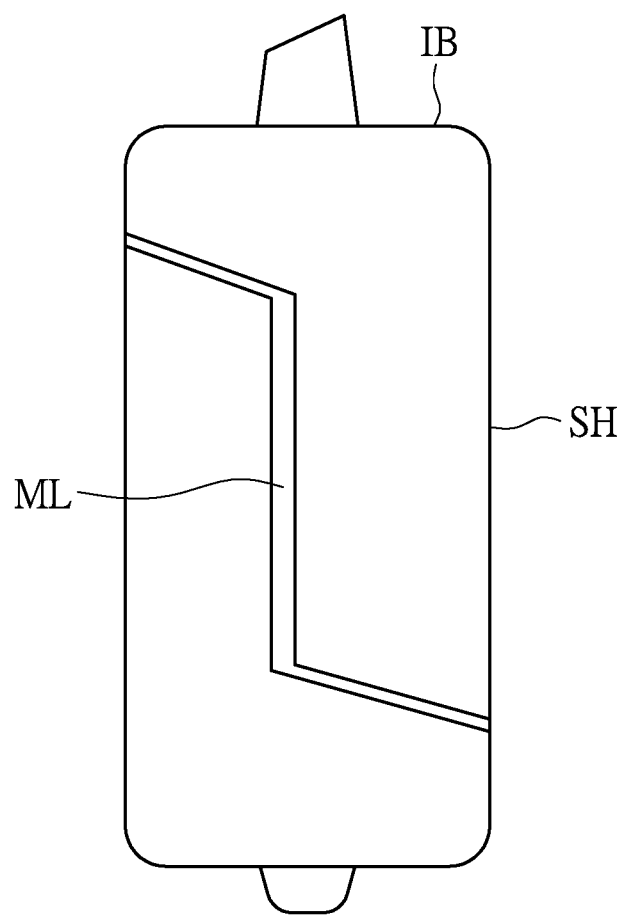
FIG. 4 is a schematic diagram of an indicator portion according to another embodiment of the present invention.

FIG. 4 is a schematic diagram of an indicator portion according to another embodiment of the present invention. Referring to FIG. 4, FIG. 4 shows an indicator portion IB installed, for example, in the charging station, in the housing of the power supply device 10 in a house or a building, or on a wall nearby. The indicator portion IB includes a shell SH and a Z-shaped display unit ML. The Z-shaped display unit ML is installed in the shell SH. The Z-shaped display unit ML is electrically connected to the indicator control unit 106. The indicator control unit 106 outputs the status control signal to the Z-shaped display unit ML. The Z-shaped display unit ML generates a dynamic display signal according to the status control signal.

The Z-shaped display unit ML is implemented, for example, by an LED light strip or multiple LEDs, OLEDs or other light-emitting devices arranged in strip. The Z-shaped display unit ML displays like a marquee with a dynamic contrast or with a dynamic gradient or in the middle of the Z-shaped display unit ML so as to broaden the field of view. Therefore, the user can see the charging status of the electric vehicle 9 at a distance. Moreover, the Z-shaped display unit ML is synchronous with the indicator unit 122. For example, when the indicator unit 122 emits green light, the Z-shaped display unit ML also emits green light to show that the charging apparatus 1 is charging the electric vehicle 9. The present invention is not limited to the examples of the Z-shaped display unit ML.

Herein, a status indication method of the charging apparatus will be further described.

Figure 5:
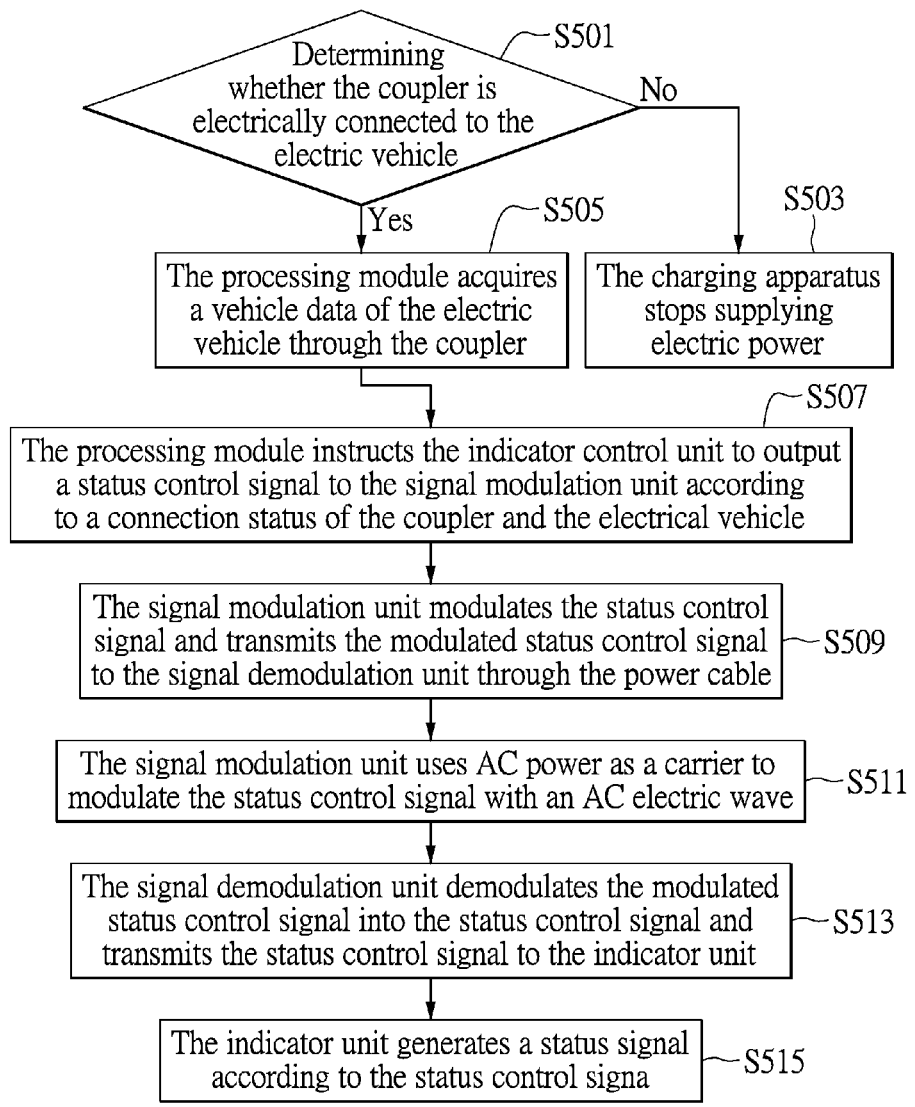
FIG. 5 is a flowchart of a status indication method according to one embodiment of the present invention.

FIG. 5 is a flowchart of a status indication method according to one embodiment of the present invention. Referring to FIG. 5, the status indication method of the charging apparatus includes the steps as follows:

In Step S501, it is determined whether the coupler is electrically connected to the electric vehicle. If the coupler is not electrically connected to the electric vehicle in Step S501, Step S503 is performed so that the charging apparatus stops supplying electric power. In other words, the charging apparatus is in a sleep mode or in a standby mode. If the coupler is electrically connected to the electric vehicle in Step S501, Step S505 is performed so that the processing module acquires a vehicle data of the electric vehicle through the coupler. Practically, the processing module acquires the vehicle data of the electric vehicle through a first signal portion of the coupler.

In Step S507, the processing module instructs the indicator control unit to output a status control signal to the signal modulation unit according to a connection status of the coupler and the electrical vehicle. In Step S509, the signal modulation unit modulates the status control signal and transmits the modulated status control signal to the signal demodulation unit through the power cable. In Step S511, the signal modulation unit uses AC power as a carrier to modulate the status control signal with an AC electric wave.

In Step S513, the signal demodulation unit demodulates the modulated status control signal into the status control signal and transmits the status control signal to the indicator unit. In Step S515, the indicator unit generates a status signal according to the status control signal. It should be noted that, in the present embodiment, the status control signal is transmitted by power cable communication from the power supply device to the indicator unit of the coupler to provide various status signals to alert the user. The present invention is not limited to the method in the flowchart in FIG. 5.

Figure 6:
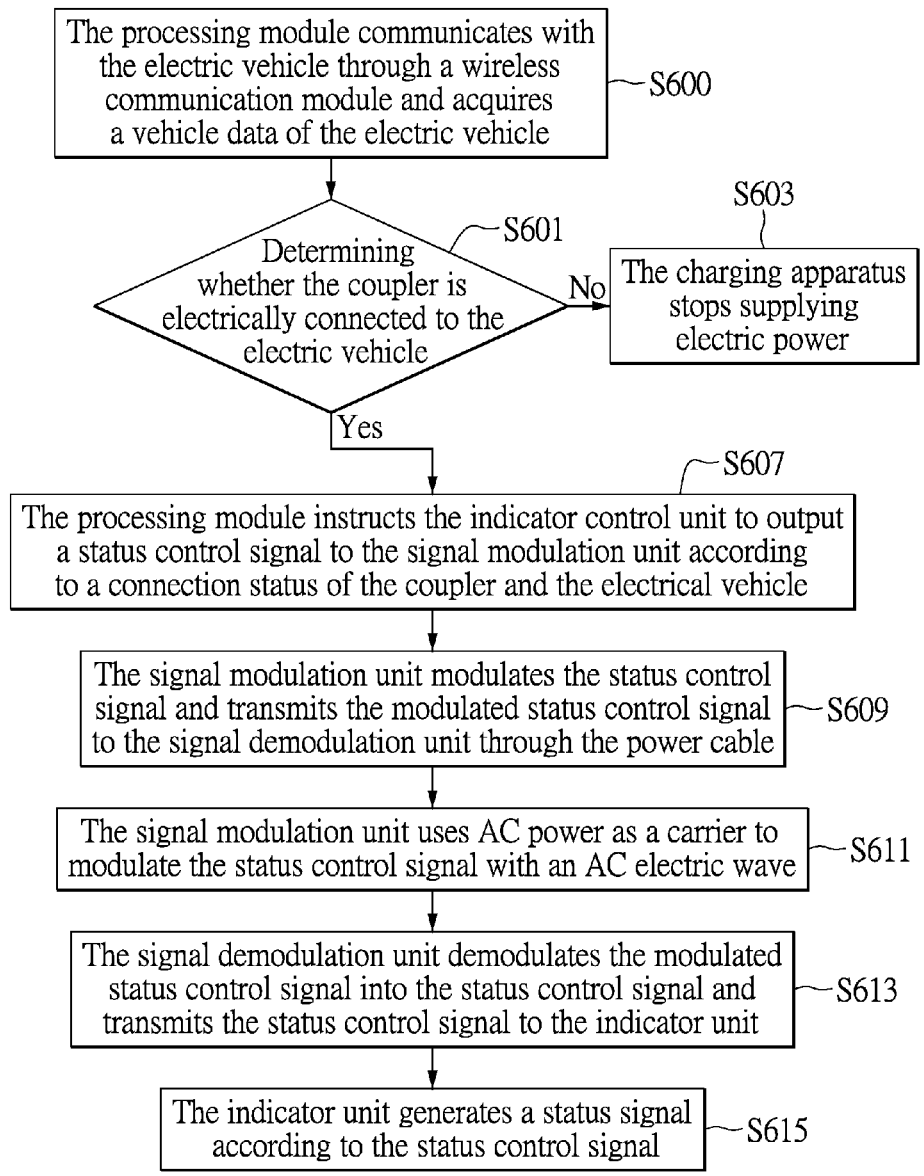
FIG. 6 is a flowchart of a status indication method according to another embodiment of the present invention.

FIG. 6 is a flowchart of a status indication method according to another embodiment of the present invention. Referring to FIG. 6, the status indication method of the charging apparatus includes the steps as follows:

In Step S600, the processing module communicates with the electric vehicle through a wireless communication module and acquires a vehicle data of the electric vehicle. Practically, the electric vehicle can be wirelessly linked to a local charging apparatus and communicates with the local charging apparatus. Therefore, the processing module conducts two-way communication with the electric vehicle. For example, the processing module may transmit the location information of the charging apparatus to the electric vehicle so that the electric vehicle can plan an optimal path to the location of the charging apparatus. Certainly, the processing module may also acquire the remaining power or other vehicle data so as to improve the processing procedures between the charging apparatus and the electric vehicle.

Then, in Step S601, whether the coupler is electrically connected to the electric vehicle is determined. If the coupler is not electrically connected to the electric vehicle in Step S601, Step S603 is performed so that the charging apparatus stops supplying electric power. If the coupler is electrically connected to the electric vehicle in Step S601, Step S607 is performed so that the processing module instructs the indicator control unit to output a status control signal to the signal modulation unit according to a connection status of the coupler and the electrical vehicle.

In Step S609, the signal modulation unit modulates the status control signal and transmits the modulated status control signal to the signal demodulation unit through the power cable. In Step S611, the signal modulation unit uses AC power as a carrier to modulate the status control signal with an AC electric wave.

In Step S613, the signal demodulation unit demodulates the modulated status control signal into the status control signal and transmits the status control signal to the indicator unit. In Step S615, the indicator unit generates a status signal according to the status control signal. In other embodiments, Step S600 can be omitted or performed between Step S601 and Step S607. In other words, Step S600 may replace Step S505 in FIG. 5. The present invention is not limited to the method in the flowchart in FIG. 6.

As previously stated, the present invention provides a charging apparatus with status indication using modulation of the status control signal with an AC electric wave so that the indicator unit of the coupler emits light beams with various colors. Therefore, the user acquires the present status of the charging apparatus by identifying the colors to enhance the convenience of the charging apparatus with status indication. More particularly, when the user is around the coupler and the coupler is at a distance (about 5 meters) from the power supply device, the user can directly acquire the present status of the charging apparatus by identifying the color of the light emitted from the indicator unit of the coupler. Accordingly, the user does not need to walk to the power supply device to see the present status of the charging apparatus. Moreover, the Z-shaped display unit of the indicator portion is installed near the power supply device so as to broaden the field of view of the indicator portion. As a result, in the present embodiment, the convenience of the charging apparatus with status indication is enhanced.

The above-mentioned descriptions represent merely the exemplary embodiment of the present invention, without any intention to limit the scope of the present invention thereto. Various equivalent changes, alterations or modifications based on the claims of present invention are all consequently viewed as being embraced by the scope of the present invention.

What is claimed is:

1. A charging apparatus with status indication for charging an electric vehicle, said charging apparatus comprising:
a power supply device comprising a processing module, an indicator control unit and a signal modulation unit, said indicator control unit being electrically connected to said processing module and said signal modulation unit, said power supply device being configured to store electric power and supply electric power to said electric vehicle; and
a coupler being electrically connected to said power supply device through a power cable, said coupler comprising a signal demodulation unit and an indicator unit, said indicator unit being electrically connected to said signal demodulation unit, said coupler being detachably electrically connected to said electric vehicle;
wherein said processing module instructs said indicator control unit to output a status control signal to said signal modulation unit according to a connection status of said coupler and said electrical vehicle, said signal modulation unit modulates said status control signal and transmits said status control signal as a modulated status control signal through said power cable to said signal demodulation unit, said signal demodulation unit demodulates said modulated status control signal into said status control signal and outputs said status control signal to said indicator unit, and said indicator unit generates a status signal according to said status control signal.

2. The charging apparatus with status indication of claim 1, further comprising a power module and a charging module, said power module and said charging module being electrically connected to said processing module, respectively, so that said power module supplies electric power to said charging module and said charging module supplies direct-current (DC) power or alternate-current (AC) power to said coupler.

3. The charging apparatus with status indication of claim 2, wherein said charging module comprises a DC charging unit and an AC charging unit, said DC charging unit being electrically connected to said power module and said power cable to supply DC power to said electric vehicle through said coupler, and said AC charging unit being electrically connected to said power module and said power cable to supply AC power to said electric vehicle through said coupler.

4. The charging apparatus with status indication of claim 2, wherein said power supply device comprises an indicator portion and a charging portion, said indicator portion being electrically connected to said charging portion, said indicator control unit and said signal modulation unit being installed in said indicator portion and said power module, said processing module and said charging module being installed in said charging portion.

5. The charging apparatus with status indication of claim 1, wherein said coupler comprises a first signal portion and a second signal portion, said first signal portion and said second signal portion being electrically connected to said power cable, respectively, so that said second signal portion detects said electric vehicle and outputs a detection signal to said processing module, and said processing module communicates with said electric vehicle through said first signal portion when said coupler is electrically connected to said electric vehicle.

6. The charging apparatus with status indication of claim 5, wherein said processing module acquires a vehicle data of said electric vehicle through said first signal portion, said vehicle data comprising a saturation power, a remaining power, an input voltage, an input current, an output voltage, an output current, a battery failure, a remaining life or a combination thereof of a battery module.

7. The charging apparatus with status indication of claim 5, wherein said coupler further comprises a first power transmission portion, a second power transmission portion and a grounding portion, said first power transmission portion, said second power transmission portion and said grounding portion being electrically connected to said power cable, respectively, said power supply device supplies electric power to said electric vehicle through said power cable, said first power transmission portion and said second power transmission portion of said coupler.

8. The charging apparatus with status indication of claim 1, wherein said signal modulation unit uses AC power as a carrier to modulate said status control signal with an AC electric wave carrier and said signal demodulation unit demodulates said status control signal from said AC electric wave.

9. The charging apparatus with status indication of claim 1, wherein said status control signal comprises a charging indicator signal, a preparation indicator signal, a charging alert indicator signal, a charging saturation indicator signal or a combination thereof.

10. The charging apparatus with status indication of claim 1, further comprising a wireless communication module being electrically connected to said processing module, said wireless communication module being configured to wirelessly communicate with said electric vehicle and acquire a vehicle data of said electric vehicle, said vehicle data comprising a saturation power, a remaining power, an input voltage, an input current, an output voltage, an output current, a battery failure, a remaining life or a combination thereof of a battery module.

* * * * *